US009653968B2

(12) United States Patent
Andersen et al.

(10) Patent No.: US 9,653,968 B2
(45) Date of Patent: May 16, 2017

(54) STATOR HOUSING HAVING HEAT PIPE WITH WICK

(75) Inventors: Lars Kannegaard Andersen, Randers NV (DK); René H. Olesen, Tilst (DK); Rasmus Sørensen, Randers C (DK)

(73) Assignee: Grundfos Management a/s, Bjerringbro (DK)

( * ) Notice: Subject to any disclaimer, the term of this patent is extended or adjusted under 35 U.S.C. 154(b) by 648 days.

(21) Appl. No.: 13/162,616

(22) Filed: Jun. 17, 2011

(65) Prior Publication Data

US 2011/0311380 A1    Dec. 22, 2011

(30) Foreign Application Priority Data

Jun. 18, 2010   (EP) .................................. 10 006 319

(51) Int. Cl.
| H02K 5/18 | (2006.01) |
| H02K 9/20 | (2006.01) |
| F04B 17/03 | (2006.01) |
| H02K 5/20 | (2006.01) |
| H02K 5/22 | (2006.01) |
| F28D 15/04 | (2006.01) |
| H02K 11/33 | (2016.01) |

(52) U.S. Cl.
CPC ................. H02K 9/20 (2013.01); H02K 5/18 (2013.01); H02K 5/20 (2013.01); H02K 5/225 (2013.01); F28D 15/04 (2013.01); H02K 11/33 (2016.01)

(58) Field of Classification Search
CPC .. H02K 5/20; H02K 9/19; H02K 5/18; H02K 9/20; H02K 5/225; F28D 15/02; F28D 15/04; F28D 15/046; F04B 17/03

USPC ....... 310/54, 58, 57; 417/410.1; 165/104.17, 165/104.21

See application file for complete search history.

(56) References Cited

U.S. PATENT DOCUMENTS

| 2,887,062 | A | * | 5/1959 | Benjamin Cametti et al. ............................. 417/357 |
| 2,913,988 | A | * | 11/1959 | White ............................. 417/357 |
| 3,681,843 | A | * | 8/1972 | Arcella ................. B21C 37/151 165/104.26 |
| 4,295,067 | A | * | 10/1981 | Binder ..................... H02K 9/20 165/104.26 |
| 4,394,344 | A | * | 7/1983 | Werner ............... F28D 15/0233 165/104.26 |
| 5,372,213 | A | * | 12/1994 | Hasebe et al. ............... 180/65.6 |
| 5,491,370 | A | * | 2/1996 | Schneider et al. .............. 310/54 |
| 6,798,094 | B2 | * | 9/2004 | Hirsou et al. ................... 310/52 |
| 6,994,151 | B2 | * | 2/2006 | Zhou ..................... H01L 23/427 165/104.21 |
| 7,168,480 | B2 | * | 1/2007 | Jankowski .......... F28D 15/0208 165/104.26 |

(Continued)

FOREIGN PATENT DOCUMENTS

| DE | 102004046821 A1 | 4/2006 |
| EP | 1717536 A1 | 11/2006 |

OTHER PUBLICATIONS

EP Search Report issued Mar. 31, 2011 in EP Application No. 10006319.

Primary Examiner — John K Kim
(74) Attorney, Agent, or Firm — Panitch Schwarze Belisario & Nadel LLP

(57) ABSTRACT

An electric motor includes a housing and at least one heat pipe for dissipating heat is integrated in the housing. Substantially all functional elements of the motor are disposed in the housing.

6 Claims, 11 Drawing Sheets

(56) References Cited

U.S. PATENT DOCUMENTS

| | | | | |
|---|---|---|---|---|
| 7,683,509 B2 * | 3/2010 | Neal | ............... | H01F 27/10 |
| | | | | 180/65.1 |
| 7,694,726 B2 * | 4/2010 | Chen | ............... | F28D 15/02 |
| | | | | 165/104.21 |
| 7,777,373 B2 | 8/2010 | Bott et al. | | |
| 2003/0222515 A1 * | 12/2003 | Ueda | ............... | H02K 3/50 |
| | | | | 310/43 |
| 2005/0241807 A1 * | 11/2005 | Jankowski et al. | ...... | 165/104.26 |
| 2006/0017335 A1 * | 1/2006 | Matin et al. | ............... | 310/57 |
| 2006/0138876 A1 * | 6/2006 | Ueda et al. | ............... | 310/43 |
| 2006/0279144 A1 * | 12/2006 | Mukai et al. | ............... | 310/52 |
| 2007/0210655 A1 * | 9/2007 | Bahr et al. | ............... | 310/54 |
| 2008/0017354 A1 * | 1/2008 | Neal | ............... | 165/104.14 |
| 2008/0018181 A1 * | 1/2008 | Neal | ............... | H02K 9/20 |
| | | | | 310/54 |
| 2008/0067882 A1 * | 3/2008 | Murata | ............... | 310/54 |
| 2008/0266803 A1 * | 10/2008 | Golhardt | ............... | H02K 9/20 |
| | | | | 361/700 |
| 2009/0045686 A1 * | 2/2009 | Michel et al. | ............... | 310/52 |
| 2010/0026108 A1 * | 2/2010 | Hassett | ............... | H02K 9/20 |
| | | | | 310/54 |
| 2010/0072834 A1 * | 3/2010 | Crane | ............... | 310/54 |
| 2010/0126703 A1 | 5/2010 | Ruan et al. | | |
| 2011/0311380 A1 * | 12/2011 | Andersen et al. | ......... | 417/410.1 |

\* cited by examiner

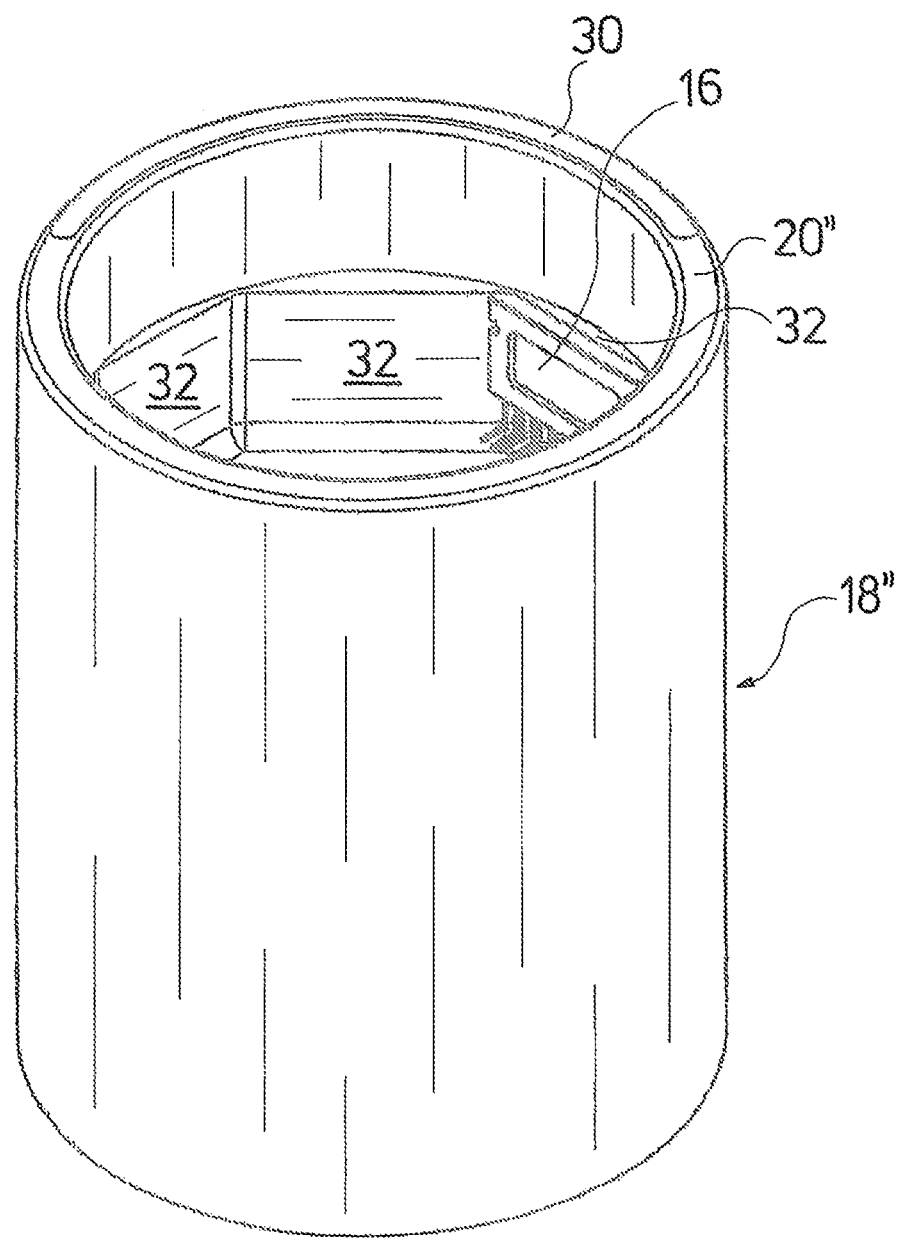

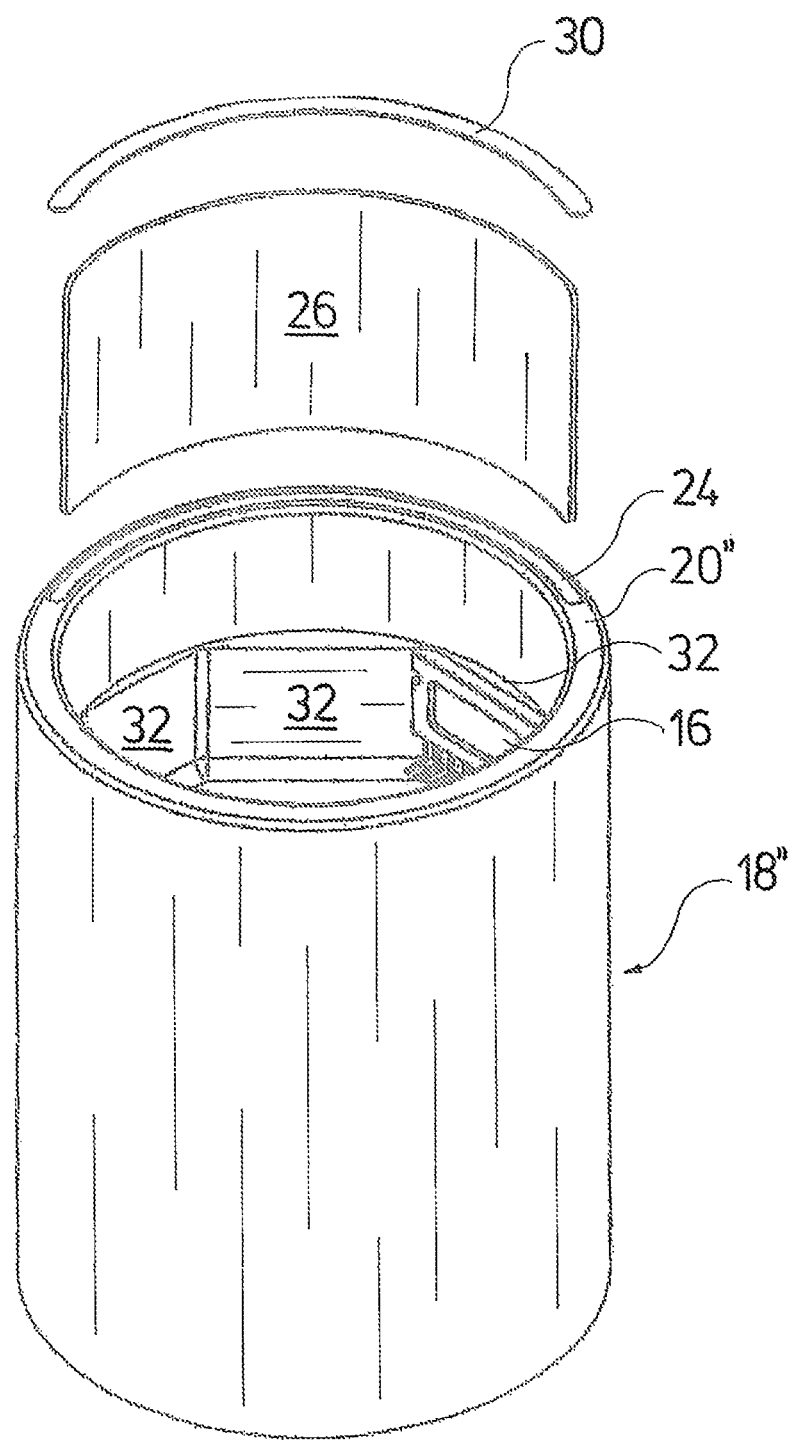

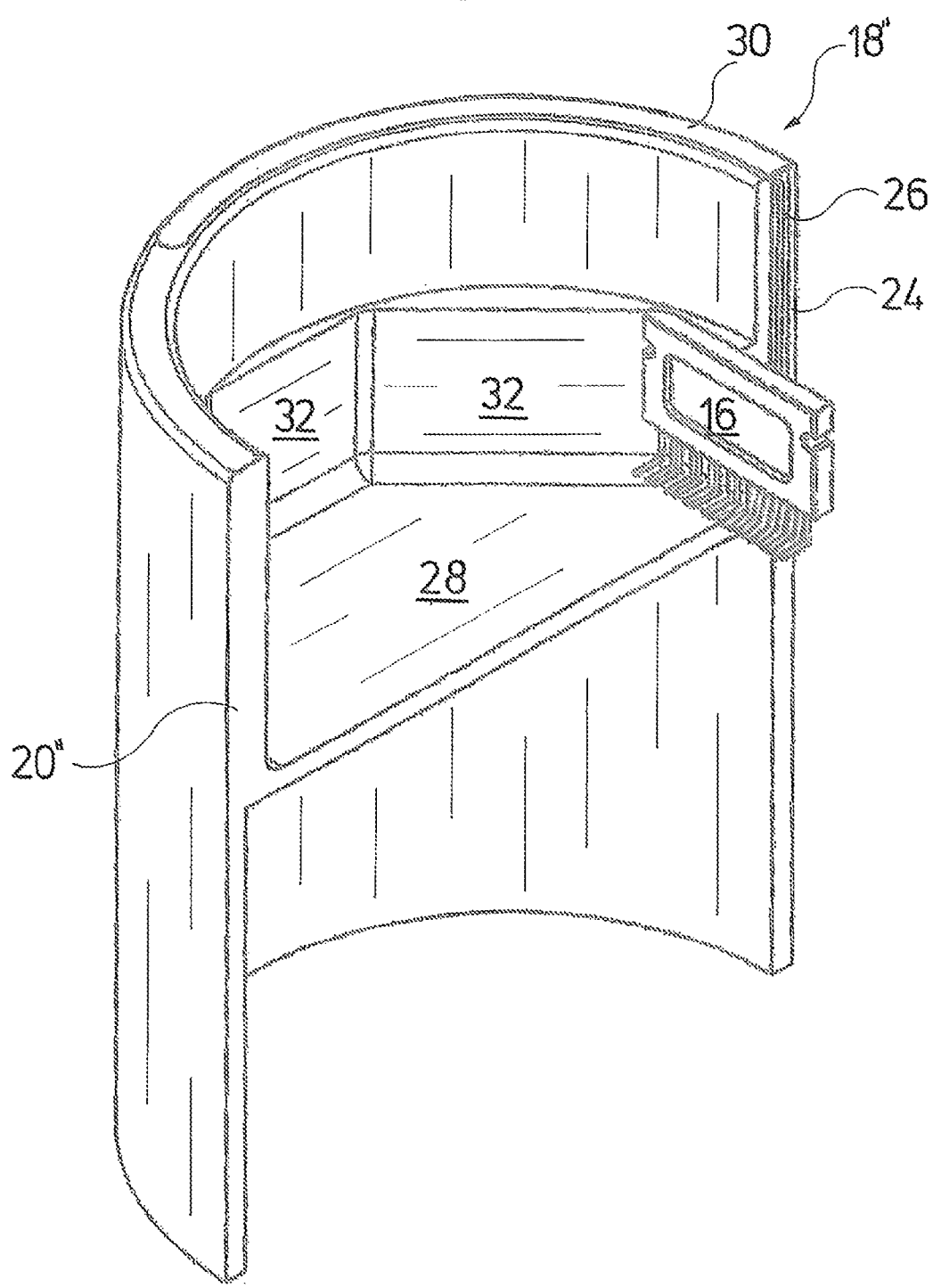

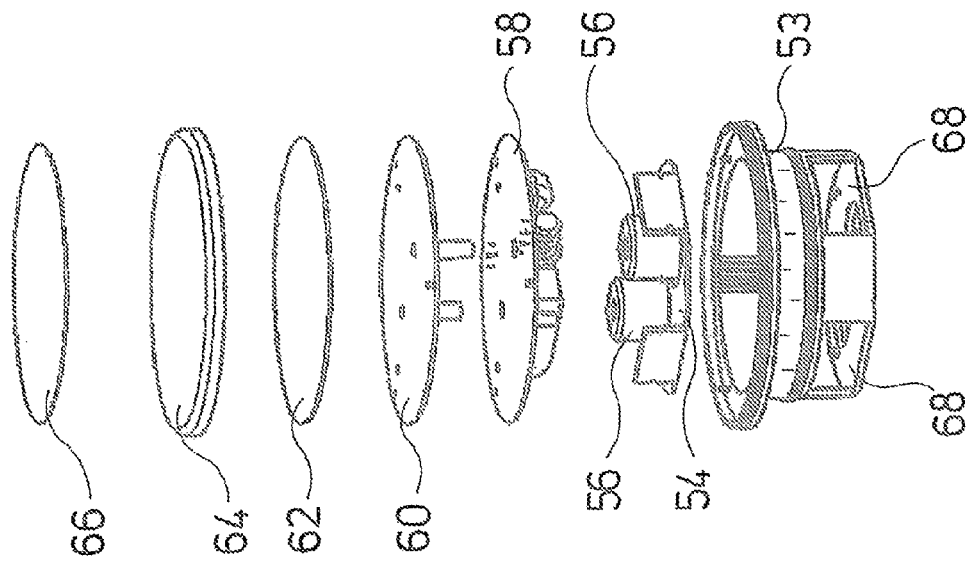
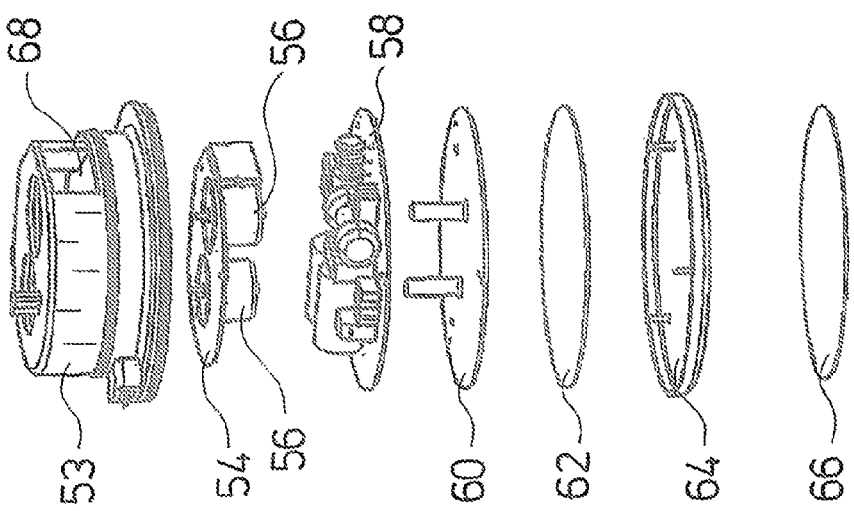

STATOR HOUSING HAVING HEAT PIPE WITH WICK

BACKGROUND OF THE INVENTION

The present invention relates generally to an electric motor.

It is known to dissipate the heat produced during operation of an electric motor from the motor on the outer side of the motor housing. Solid heat conductors, for instance, have been used in the housings of electric motors for this purpose, in order to dissipate the waste heat from heat-generating components, such as components of the power electronics at first to the outer wall of the motor and, from there, to the surroundings external to the motor.

Disadvantageously, the heat conductors require a relatively great deal of installation space depending on the amount of heat inside the motor housing to be dissipated, and thus significantly affect the overall size of electric motors. Furthermore, the heat-generating components must always be disposed close to the heat-dissipating outer surfaces.

BRIEF SUMMARY OF THE INVENTION

Proceeding therefrom, a problem addressed by a preferred embodiment of the present invention is that of creating an electric motor that has improved heat dissipation compared to that of electric motors known in the prior art.

The above problem is solved by an electric motor having at least one housing and at least one heat pipe for dissipating heat is integrated in the housing. Advantageous developments of this engine will become apparent from the description that follows and the drawings. According to a preferred embodiment of the present invention, the features indicated in the dependent claims and the description can also further embody the solution—according to a preferred embodiment of the present invention—per the independent claim(s) alone or in a suitable combination thereof.

The electric motor according to a preferred embodiment of the present invention includes at least one housing. Functional elements of the motor, preferably substantially all functional elements of the motor, are disposed in the housing in a usual manner. Moreover, according to a preferred embodiment of the present invention, at least one heat pipe for dissipating heat is integrated in the housing of the electric motor.

A heat pipe is a heat exchanger including a closed, preferably elongated hollow body which is filled to a partial extent with a fluid. When heat enters the heat pipe, the fluid evaporates in the region of the heat input, and condenses in a section of the heat pipe at a distance from the region of the heat input, at which point it releases the previously absorbed heat.

In the electric motor according to a preferred embodiment of the present invention, such a heat pipe or heat pipes replace the previously common heat conductors used to dissipate heat from the interior of the motor housing. Advantageously, it has been proven that the heat flow density that occurs when heat is dissipated from a heat pipe is greater than that of heat conductors used to date.

The heat pipes that are used can therefore have a more compact size compared to heat conductors used to date, yet still dissipate the same amount of heat, and so the entire electric motor can output the same power as previously known motors, yet comprise much smaller dimensions. Furthermore, heat can be dissipated across longer paths, thereby allowing for greater freedom in the placement of the heat-generating components. Heat can also be dissipated more easily across larger housing regions.

Alternatively, it is typically also possible to use heat pipes having dimensions that correspond substantially to those of heat conductors used so far, thereby enabling electric motors to be created that have greater power compared to motors known so far, given the same motor size.

In regard to the power electronics used in electric motors, which typically represent a significant source of heat in the interior of the motor housing, heat pipes—due to the very good heat dissipation properties thereof—also advantageously make it possible to use lower cost power electronic components which in fact generate more waste heat, although this is acceptable since this greater amount of heat can be easily dissipated by a heat pipe.

Advantageously, the housing in which the heat pipe is disposed can be a stator housing of the motor. The heat pipe can therefore be disposed in a housing which encapsulates the stationary part of the electric motor on which the coil or coils (19) are mounted.

The electric motor according to a preferred embodiment of the present invention is preferably part of a pump unit. Pump units are typically composed of an electric motor and a pump, which is driven by the motor, and include the stator housing as well as a pump housing which abuts the end of the stator housing through which the rotor or drive shaft of the motor extends out of the stator housing. Advantageously, the housing in which the heat pipe is integrated can also be the pump housing. It is also feasible to situate the heat pipe such that it extends from the stator housing into the pump housing directly adjacent thereto, or it is possible to place at least one heat pipe in the stator housing and at least one heat pipe in the pump housing.

Electric motors can include, on the outer side of the housing thereof, a terminal box which typically establishes a connection of the motor to an electric power supply, and often contains at least one portion of the power and control electronics, and the operating elements of the motor. In the case of pump units, a terminal box may also be disposed on the outside of the pump housing. In the sense of the invention, such an additional terminal box advantageously also forms a portion of the motor housing, in which the at least one heat pipe can be integrated, i.e. the heat pipe can also be disposed in an additional housing installed on the outer side of the stator or pump housing and dissipate the waste heat of heat-generating components installed there.

The heat pipe is preferably integrated in a wall of the housing, i.e. in particular the stator housing, pump housing, and/or terminal box. A wall of the housing is therefore used as a receptacle for the heat pipe. The receptacle can be formed on an outer side of the wall, e.g. in a groove formed therein, or entirely inside the wall. The wall used to accommodate the heat pipe expediently communicates with an outer side of the housing or forms an outer wall.

Expediently, at least one heat-generating component is disposed on an outer side of the heat pipe in the region of an evaporator end. The component or a group of heat-generating components are therefore situated on the heat pipe, or, conversely, the heat pipe is situated on at least one heat-generating component such that the heat-generating component has thermally conductive and preferably direct contact with the site of the heat pipe at which the heat pipe forms an evaporator surface for the fluid located in the heat pipe. Contact having the greatest surface area possible between the component or components and the heat pipe typically ensures that heat transfer from the component to the heat pipe is particularly effective.

Advantageously, the housing of the electric motor can form a portion of the at least one heat pipe. In this context, it is preferably provided that a section of the housing forms or includes a hermetically sealable cavity of the heat pipe that can be filled with the working fluid.

Particularly preferably, a recess that forms at least one portion of the heat pipe can be formed in a wall of the housing. A housing wall of the motor according to a preferred embodiment of the present invention is therefore hollow in at least one section, wherein the wall sections that bound the thusly formed cavity on the outside form the outer shell of the heat pipe. The recess can be formed directly in a wall of the housing. Alternatively, a housing wall can have a double-wall design at least in one section, wherein an intermediate space between interspaced wall sections forms the recess.

To form a heat pipe, at least one working fluid of the heat pipe is advantageously accommodated in the recess. If the heat pipe is configured such that the condensed working fluid cannot flow back to the evaporator region of the heat pipe by the force of gravity, a wick can be advantageously accommodated in the recess next to the working fluid. In heat pipes, the wick is typically used to conduct the working fluid from the condenser region back to the evaporator region of the heat pipe. For this purpose, the wick is preferably formed of a capillary material that enables the working fluid to be conducted back, by way of the capillary effect. Basically, any materials and fluids that are typically used in heat pipes can be used as the wick material and working fluid.

The dimension and shape of the wick are preferably such that sufficient space for the working fluid remains in the recess. For instance, the wick can have an outer geometry that is smaller than the inner geometry of the recess, or that approximately corresponds to the inner geometry of the recess, wherein a cavity is formed inside the wick, which connects the evaporator region of the heat pipe with the condenser region thereof.

As mentioned above, a heat pipe comprises a cavity filled with a wick and a working fluid, and which is tightly closed with respect to the surroundings thereof. If a recess formed in a wall forms the cavity for accommodating the wick and the working fluid, it is typically also necessary to close the inner lumen of the recess tightly with respect to the outer surroundings thereof. For this purpose, a cover can be advantageously provided, which is used to hermetically seal the recess by covering an opening of the recess.

If the heat pipe is integrated in a recess of a housing wall of the electric motor, it is advantageous for the at least one heat-generating component to rest against the wall of the housing, i.e. preferably against the inner side of the housing wall in the region of the recess. A direct heat bridge from the component to the heat pipe is therefore established, thereby enabling the waste heat from the component to be dissipated out of the housing of the motor according to a preferred embodiment of the present invention along the shortest route. Advantageously, the contour, in particular the inner contour of the wall in the region in which the heat-generating component rests against the wall, is adapted to the contour of the heat-generating component, thereby creating the largest possible contact area between the component and the wall.

Particularly advantageously, at least one flat section can be formed on the wall of the housing for placement of the at least one heat-generating component. On the flattened wall section, the heat-generating component advantageously touches the wall likewise via a flat side, and therefore a relatively large contact region exists between the component and the wall, which enables a correspondingly large quantity of heat to be dissipated from the component into the heat pipe.

In a further advantageous preferred embodiment of the present invention, the at least one heat-generating component can be disposed in an inner housing situated in the housing, wherein the waste heat-generating component contacts a wall of the housing directly or indirectly through openings formed in the inner housing. The use of an inner housing makes it possible e.g. to preassemble assemblies of electronic components of the motor, such as printed circuit boards outside of the motor housing, in the inner housing, and to subsequently insert the preassembled inner housing into the motor housing. A component that generates waste heat is disposed in the inner housing, advantageously directly in front of the opening formed in the inner housing, thereby enabling a thermally conductive connection to be established, through the opening, between the heat-dissipating component and the heat pipe integrated in the housing wall since they come in direct contact with one another.

To enable heat to be dissipated from the motor housing to the surroundings external to the motor as effectively as possible, it is reasonable for the outer surface of the motor housing to be as large as possible. In this context, cooling fins can be advantageously formed on the outer side of the motor housing. It has proven particularly suitable to provide the cooling fins at least in the region of the motor housing that abuts the condenser region of the heat pipe. The cooling fins are therefore formed on the motor housing preferably at least in a section that abuts the region of the heat pipe in which the heat pipe dissipates the heat that was previously absorbed by a heat-generating component.

Preferably, the heat pipe extends by way of the longitudinal axis thereof parallel to the rotational axis of the motor. As a result, the heat pipe preferably has the same orientation as the rotor or a drive shaft of the motor according to a preferred embodiment of the present invention, which is coupled thereto. It should be pointed out, however, that the heat pipe can have basically any orientation in the housing. For instance, the heat pipe can also be oriented transversely or obliquely to the rotational axis of the motor, in particular when it is disposed in a terminal box or a pump housing.

As mentioned above, the electric motor according to a preferred embodiment of the present invention is preferably part of a pump unit. The present invention therefore also relates to a pump unit that includes a pump and an electric motor having the above-stated features, as a drive motor. The use of the heat pipe in the motor housing and/or the pump housing makes it possible to obtain a more compact design of the pump unit compared to previously known pump units having the same power, or to design the pump unit to have greater power compared to pump units of the same size. The waste heat of electronic components such as power interrupters can be distributed across larger housing regions more easily using the heat pipe.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 7 is a schematic, perspective exploded view of a stator housing of an electric motor according to a sixth preferred embodiment of the present invention;

FIG. 8 is an exploded view of the stator housing according to FIG. 7;

FIG. 9 is a longitudinal sectional view of the stator housing according to FIG. 7;

FIG. 12 is a top perspective exploded view of an inner housing for placement in a stator housing; and FIG. 13 shows the inner housing according to FIG. 10 in an underside view.

DETAILED DESCRIPTION OF THE INVENTION

Figure 1:
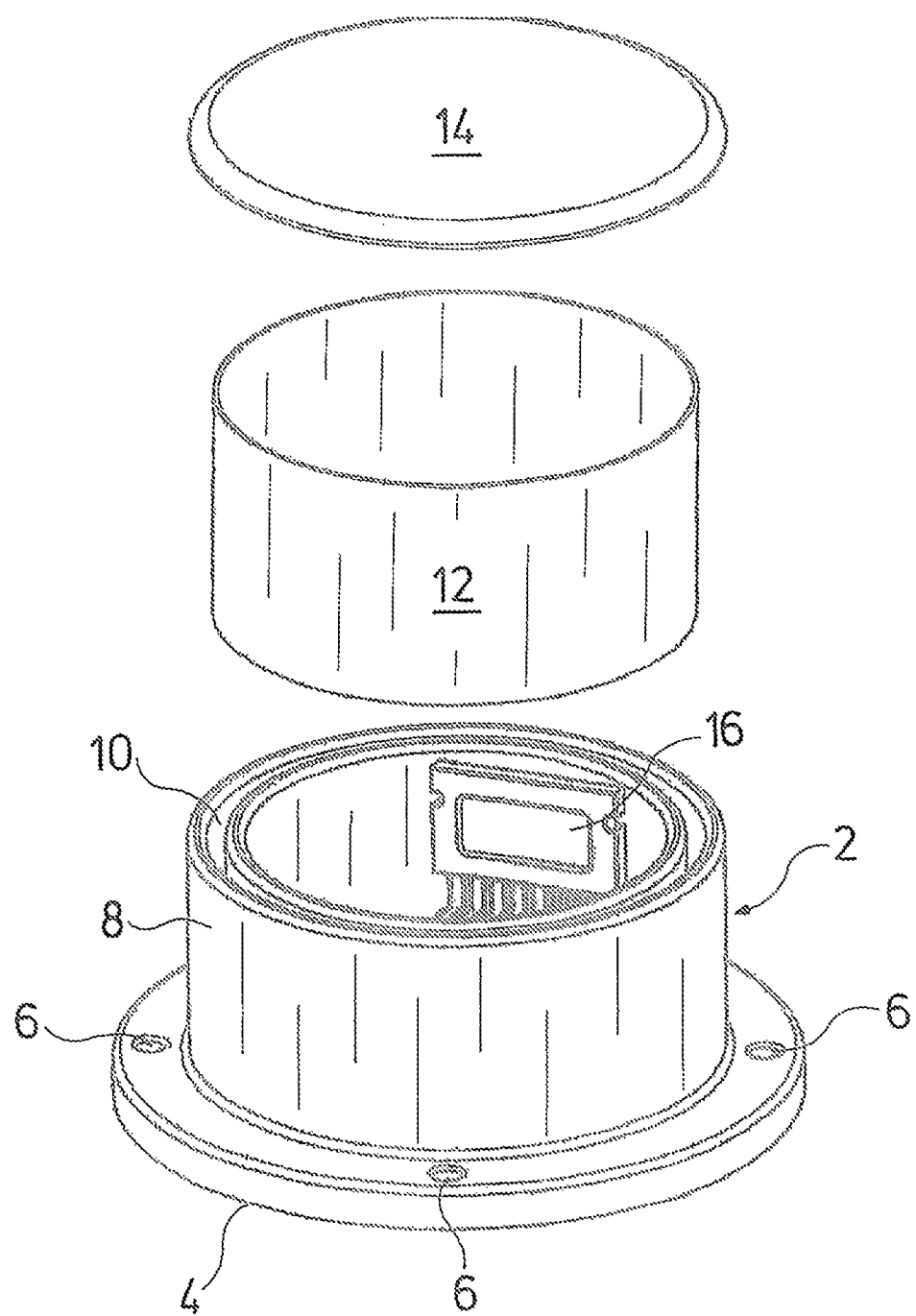
FIG. 1 is a schematic, perspective exploded view of a first stator housing of an electric motor in accordance with a first preferred embodiment of the present invention.

Certain terminology is used in the following description for convenience only and is not limiting. The words "top" and "front" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

A stator housing 2 of an electric motor, which is part of a pump unit, is shown in FIG. 1. The stator housing 2 is typically used to accommodate a stator 17 of the electric motor. The stator 17 is shown schematically in FIGS. 10 and 11. The shape of stator housing 2 is substantially hollow-cylindrical, and a flange 4 is preferably formed on one end of stator housing 2. The flange 4 is used to attach the stator housing 2 to a pump housing. For this purpose, a plurality of holes 6 are preferably formed in the flange 4, which are distributed evenly around the circumference thereof and are used to accommodate fastening screws which are not shown.

An outer wall 8 of the stator housing 2 is preferably hollow. That is, an annular recess 10 which extends around the entire circumference and in the longitudinal direction of the outer wall 8 is formed in the outer wall 8. The recess 10 is used to accommodate a wick 12 of a heat pipe which is therefore formed in part by the outer wall 8 of the stator housing 2. As soon as the wick 12 has been inserted through an end-face opening into the recess 10 and a fluid, as the working medium, has been filled therein, the recess 10 is closed on the end face using a cover 14 which closes entire the stator housing 2 on the end facing away from the flange 4.

The wick 12 preferably has the shape of a cylindrical ring. As is typical for the wick of a heat pipe, the wick 12 is composed of a capillary material, as is the case for all of the wicks depicted in the drawings described below. The wick 12, as well as the remaining wicks that are depicted, can be formed e.g. by first forming a film out of the capillary material by film casting, then wrapping the film around a cylindrical core to form a cylindrical ring and hardening same by sintering. Another method that can be used to form wick 12 is metal injection molding (MIM) which is advantageous in particular for obtaining complex wick geometries.

The heat pipe, which is formed by the outer wall 8 and the wick 12 disposed therein, is used to dissipate heat from a heat-generating component 16, such as power electronics or a power interrupter, disposed in the stator housing 2. Advantageously, the component 16 is disposed in the direct vicinity of or rests against an inner side of the outer wall 8, in order to ensure that heat is transferred from the component 16 to the heat pipe as effectively as possible.

Figure 2:
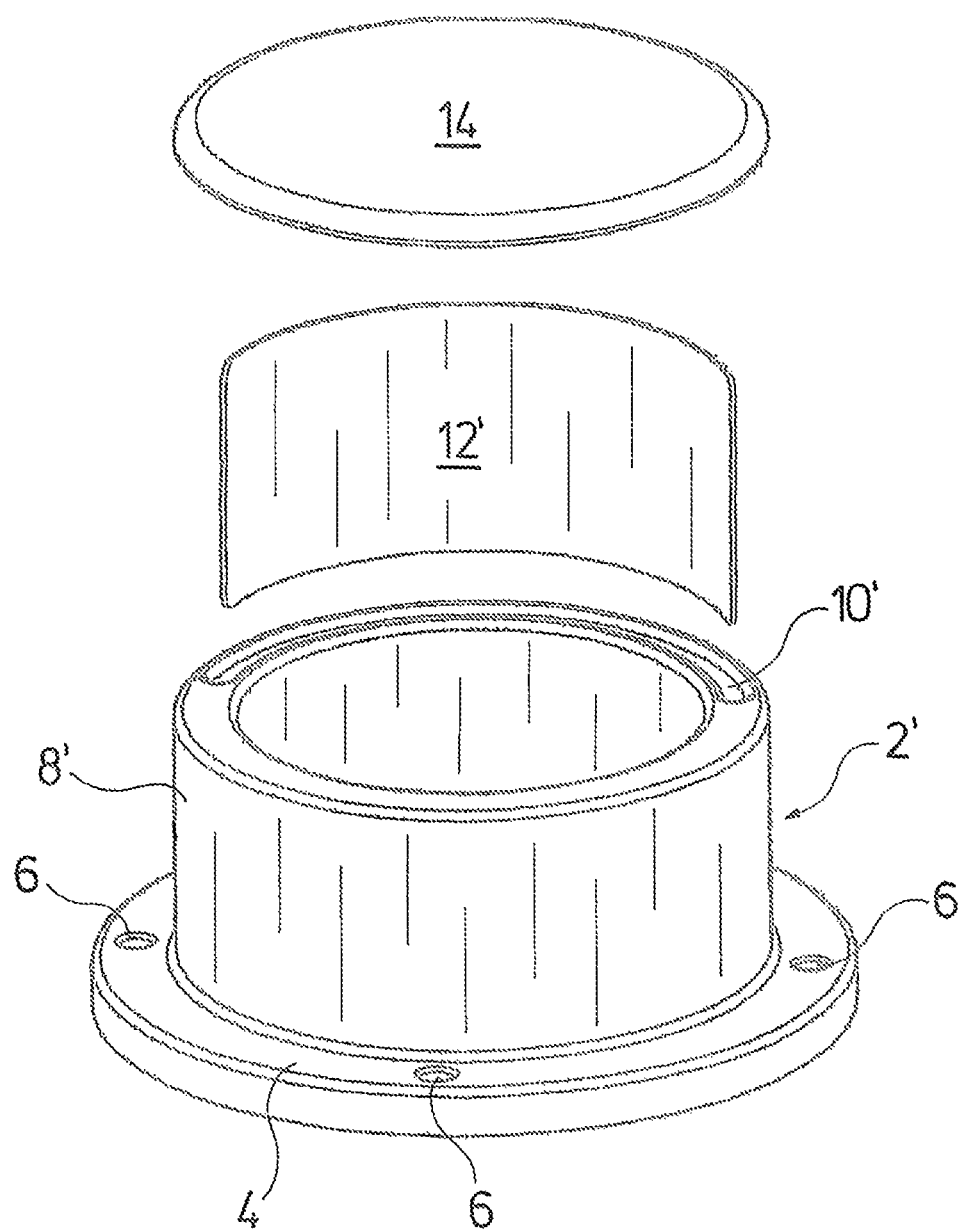
FIG. 2 is a schematic, perspective exploded view of a stator housing of an electric motor according to a second preferred embodiment of the present invention.

The stator housing 2' depicted in FIG. 2 preferably differs from the stator housing 2 depicted in FIG. 1 only in regard to the preferred embodiment of the heat pipe, i.e. the embodiment of the recess 10', which is formed in an outer wall 8' of the stator housing 2', and the wick 12' to be situated therein. The recess 10' extends only around half of the circumference of the outer wall 8'. Corresponding thereto, a wick 12' to be placed in the recess 10' has the shape of a cylindrical ring segment that extends around an angle of 180°.

Figure 3:
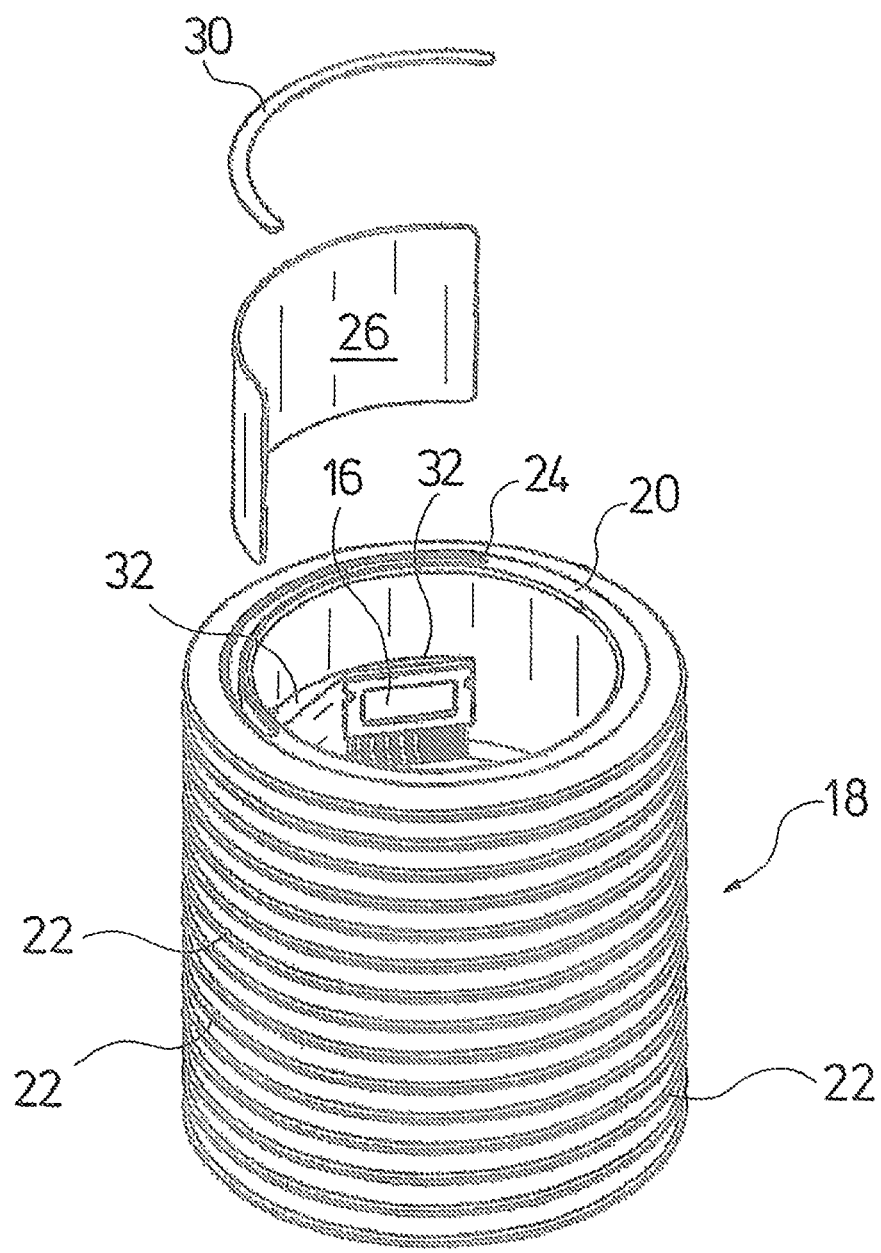
FIG. 3 is a schematic, perspective exploded view of a stator housing of an electric motor according to a third preferred embodiment of the present invention.
Figure 4:
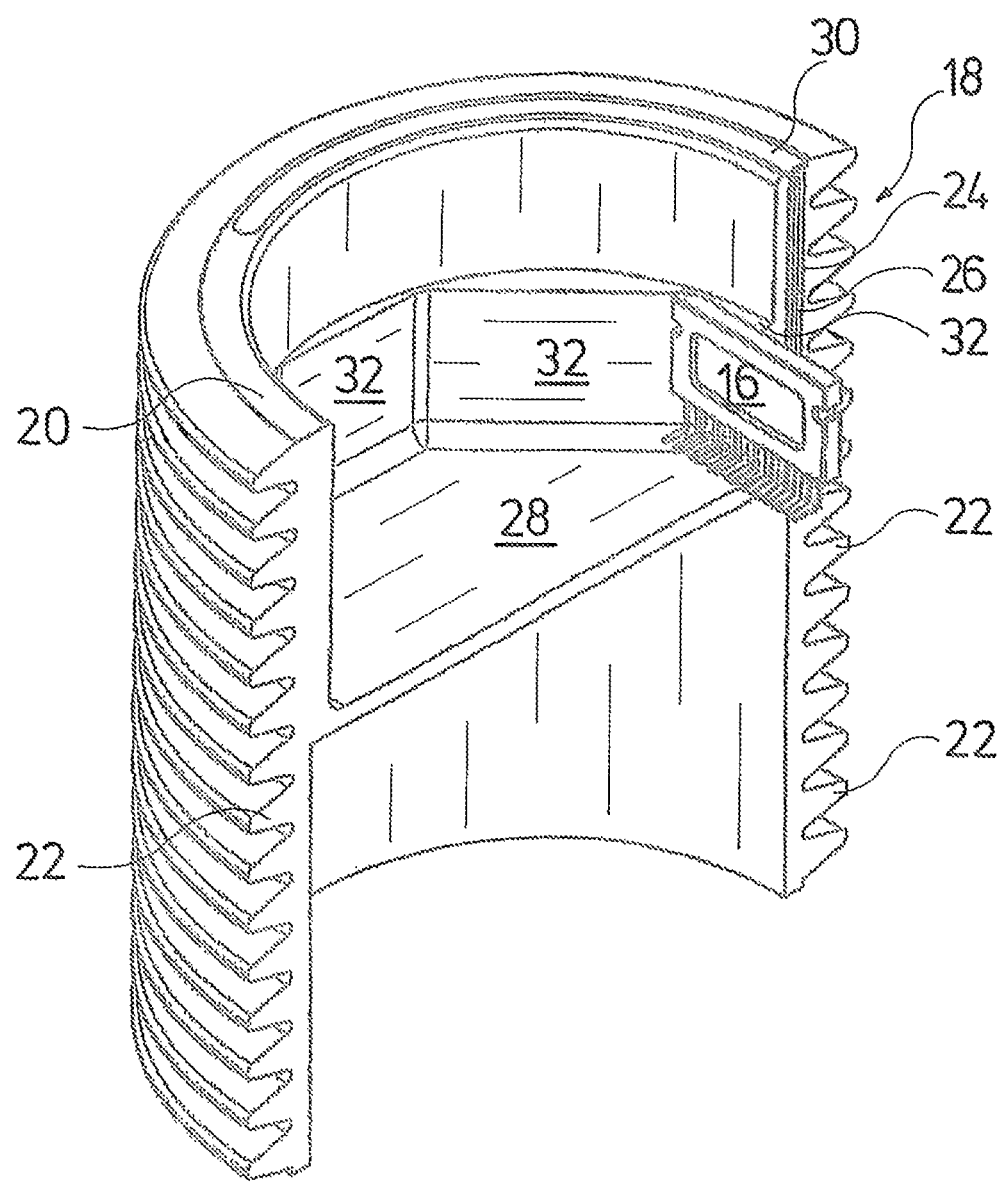
FIG. 4 is a longitudinal sectional view of the stator housing according to FIG. 3.

FIGS. 3 and 4 show a stator housing 18, in the case of which an outer wall 20 of stator housing 18 is provided with a large number of cooling fins 22 on the outer side thereof. The outer wall 20 of the stator housing 18 also forms a portion of a heat pipe. For this purpose, a recess 24 which is used to accommodate a wick 26 is also formed in the outer wall 20. The recess 24 extends in the circumferential direction of the outer wall 20 across an angular range of approximately 180° and in the longitudinal direction of the outer wall 20 up to the height of a transverse wall 28 which divides the inner lumen of the stator housing 18 into two separate sections. The wick 26 is preferably arched in a manner that corresponds to the circumferential contour of the recess 24, and extends in the direction of the arch across an angular range of approximately 180°. A cover 30 having a contour that corresponds substantially to the cross-sectional contour of the recess 24 is provided to hermetically seal the recess 24 and the wick 26 disposed therein.

Projections 32 are formed at the level of the recess 24 and directly adjacent to the transverse wall 28, on the inner side of the stator housing 18, and form flat sides that intersect the otherwise circular inner cross-sectional contour of the stator housing 18 in such a way that a hexagon is formed. At least one of the flat sides formed by the projections 32 is used as a contact surface for a heat-generating component 16. The waste heat thereof can therefore be transferred to the heat pipe in a particularly effective manner and, from there, can be dissipated into the surroundings of the stator housing 18 via the outer wall 20 and the cooling fins 22 formed thereon.

Figure 5:
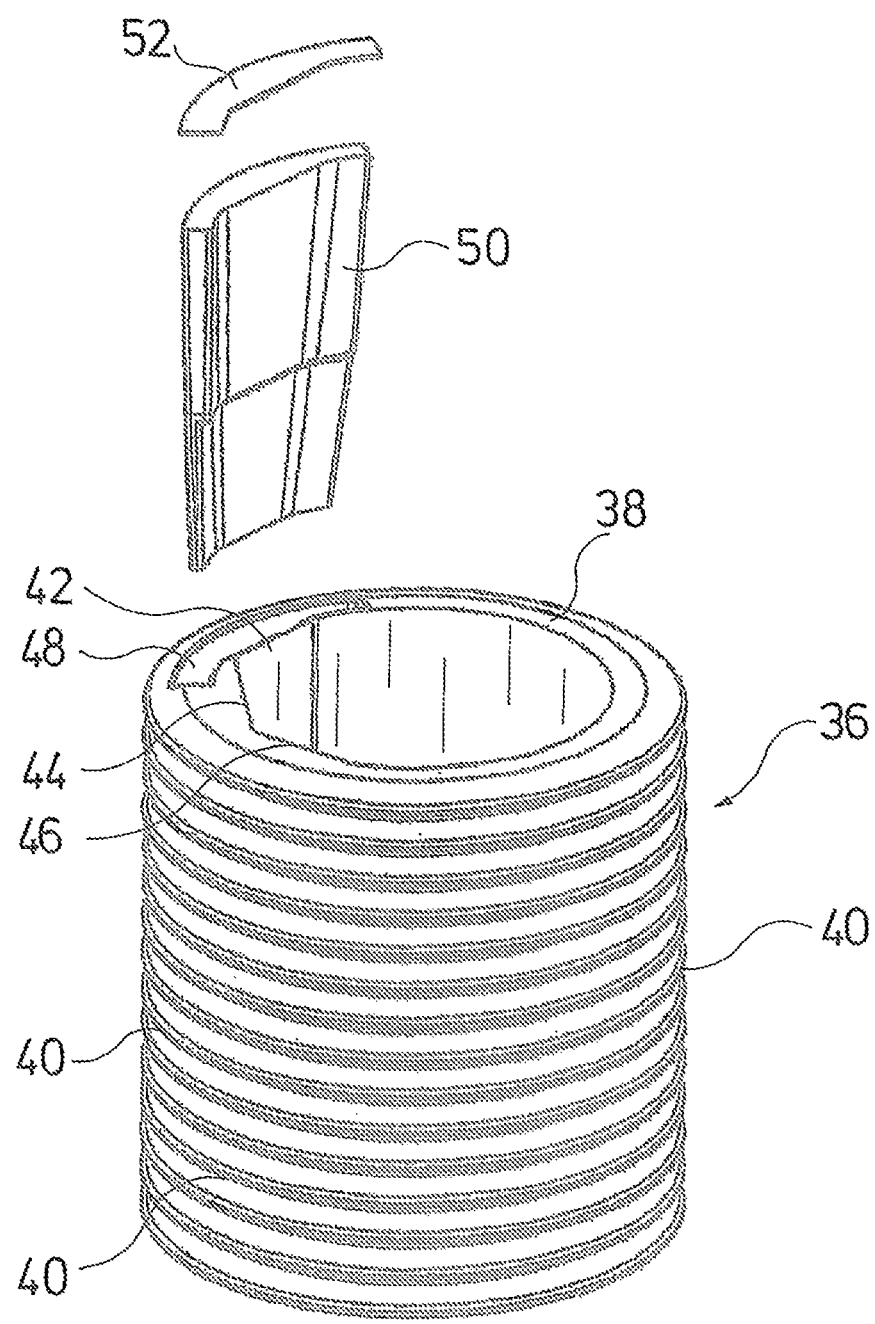
FIG. 5 is a schematic, perspective exploded view of a stator housing of an electric motor according to a fourth preferred embodiment of the present invention.

FIG. 5 shows a stator housing 36, in the case of which a large number of cooling fins 40, which extend around the entire circumference of an outer wall 38, are likewise formed on the outer wall 38 thereof. The inner cross-sectional contour of the stator housing 36 is largely circular in shape, but forms three adjacent flat sides 42, 44, and 46 in one section. In the region of the flat side 42, a recess 48 is formed in the outer wall 38, which extends in the circumferential direction of outer wall 38 beyond the two ends of the flat side 42. The cross-sectional contour of the recess 48 is round on the outer side thereof that corresponds to the outer contour of the outer wall 38, yet is flat on the inner side thereof that corresponds to the flat side 42. The recess 48 is used to accommodate a wick 50, the shape of which corresponds substantially to the shape of the recess 48. A cover 52 having an outer contour that corresponds substantially to the outer contour of the recess 48 is provided to hermetically seal the recess 48.

Figure 6:
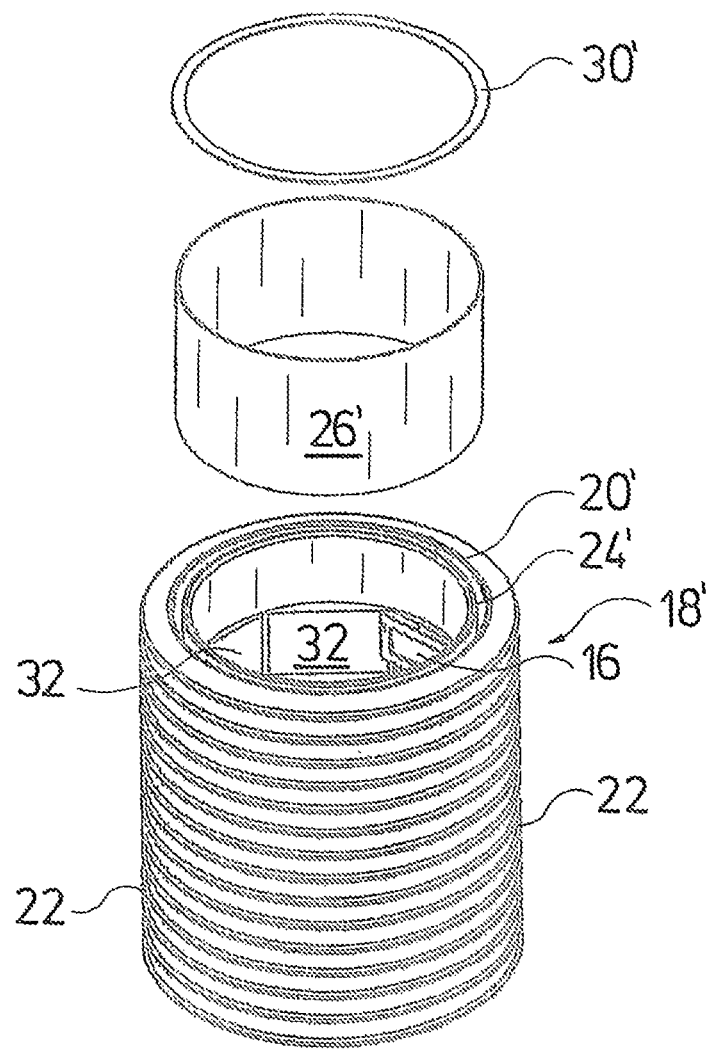
FIG. 6 is a schematic, perspective exploded view of a stator housing of an electric motor according to a fifth preferred embodiment of the present invention.

The stator housing 18' depicted in FIG. 6 corresponds substantially to the stator housing 18 shown in FIGS. 3 and 4. The Stator housing 18' preferably differs from the stator housing 18 in that a recess 24' is formed in an outer wall 20' of the stator housing 18', which extends around the entire circumference of the outer wall 20'. Corresponding thereto, a wick 26', which is intended to be placed in the recess 24', is designed as a cylindrical ring, and a cover 30' for closing the recess 24' is annular in shape.

The stator housing 18" depicted in FIGS. 7-9 also corresponds substantially to the stator housing 18 depicted in FIGS. 3 and 4. It differs from the stator housing 18 only in that no cooling fins 22 are formed on the outer side of the outer wall 20" of the stator housing 18".

Figure 11:
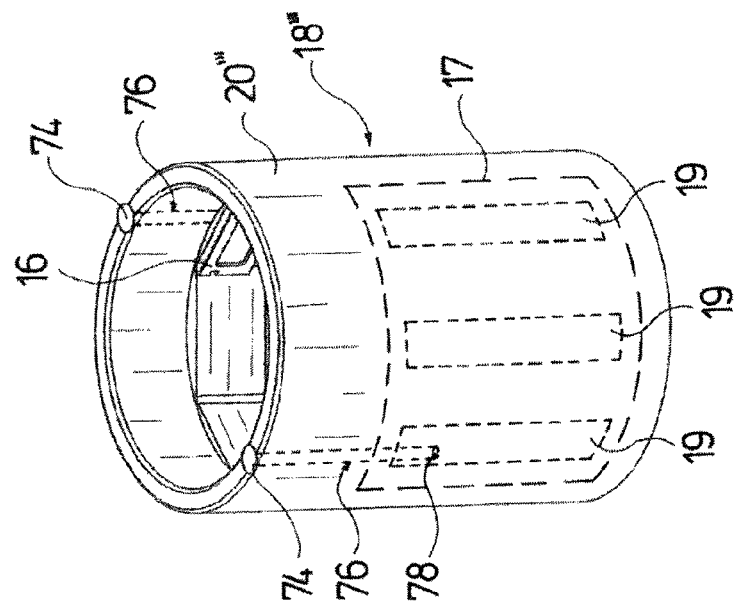
FIG. 11 shows the stator housing according to FIG. 10 in an installed state.
Figure 10:
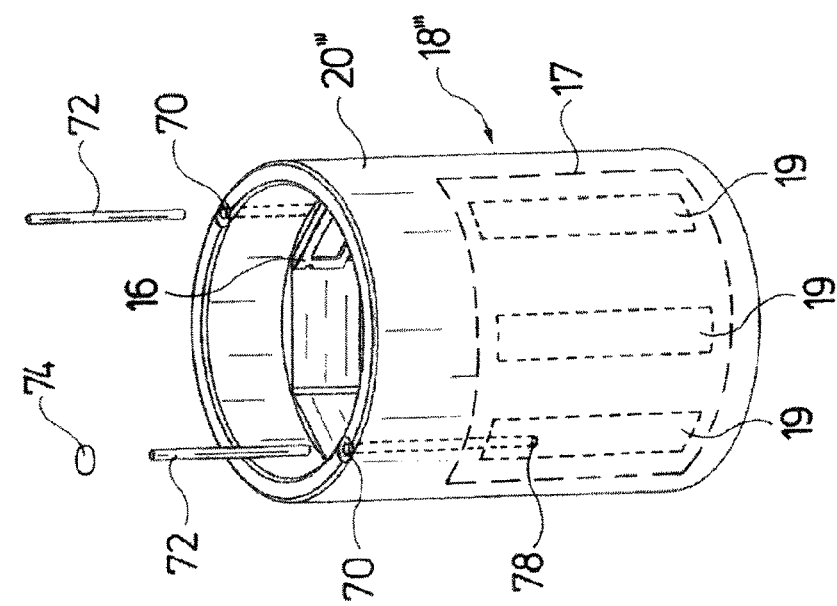
FIG. 10 is a schematic, perspective exploded view of a stator housing of an electric motor according to a seventh preferred embodiment of the present invention.

The stator housing 18''' depicted in FIGS. 10 and 11 is preferably similar to stator housing 18" depicted in FIGS. 7-9. As mentioned above, a heat pipe 76 comprises a closed cavity or recess 70, which is filled to a partial extent with working fluid. In the illustrated embodiment of FIGS. 10 and 11, the heat pipe 76 further included a tubular wick 72 inserted into the recess 70. As shown in FIGS. 10 and 11, two recesses 70, which are preferably diametrically opposed and extend in the longitudinal direction of the outer wall 20''', are formed as holes in an outer wall 20''' of the stator housing 18'''. The tubular wicks 72 are inserted into the recesses 70. The open inner lumen of the wick 72 forms the space for the working fluid required to form heat pipes 76 having evaporated ends 78. The recesses 70 are hermetically sealed using covers 74.

FIGS. 12 and 13 show an inner housing 53 preferably including various electronic components disposed therein. The inner housing 53 is preferably formed of plastic and is intended for installation in a stator housing of an electric motor. One end face of the inner housing 53 is closed, while a second end face of the inner housing 53 is open.

A first printed circuit board 54 comprising components 56 of the power electronics disposed thereon, and a main printed circuit board 58 are installed in the inner housing 53 starting at the closed end face. The following are disposed adjacent thereto, in the direction toward the open end face of the inner housing 53, a cover plate 60, a display printed circuit board 62, a display cover 64, and a display 66.

The components 56 of power electronics disposed on the printed circuit board 54 generate a relatively large amount of heat, which must be dissipated out of the stator housing via at least one heat pipe formed there. To enable the components 56 to be brought into direct, thermally conductive contact with the heat pipe and the housing containing same, openings 68 are formed in the circumferential side of the inner housing 53 corresponding to the position of the components 56, through which the components 56 can be brought into thermally conductive contact with the housing containing the heat pipe.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A stator housing for enclosing a stator of an electric motor on which at least one coil is mounted, the stator housing comprising:
    an outer housing wall,
    at least one heat pipe for dissipating heat, the at least one heat pipe including a substantially sealed cavity, a wick within the cavity, the wick having an open inner lumen, and a working fluid within the inner lumen of the wick, the working fluid partially filling the inner lumen when in liquid form, and
    at least one power electronics component, generating heat as waste energy, positioned on an inner side of the outer housing wall,
    wherein the outer housing wall includes a recess forming at least a portion of the cavity of the at least one heat pipe such that the at least one heat pipe is formed into the housing wall and the at least one power electronics component is located proximate the recess at an evaporator end of the at least one heat pipe.

2. The stator housing for an electric motor according to claim 1, further comprising a cover (14, 30, 30', 52, 74) hermetically sealing the recess (10, 10', 24, 24', 48, 70) in the housing wall.

3. The stator housing for an electric motor according to claim 1, wherein at least one flat section is formed on the housing wall for placement of at least one heat-generating component thereon.

4. The stator housing for an electric motor according to claim 1, wherein the at least one power electronics component for generating heat is disposed in an inner housing (53) situated in the housing, and wherein the at least one power electronics component has direct or indirect contact with the housing wall via openings (68) formed in the inner housing (53).

5. The stator housing for an electric motor according to claim 1, further comprising cooling fins (22, 40) formed on an outer side of the housing.

6. The stator housing for an electric motor according to claim 1, wherein the at least one heat pipe is integrated in an outer wall (8, 8', 20, 20', 20", 38) of the housing.

* * * * *